United States Patent
Prest

[15] 3,690,529
[45] Sept. 12, 1972

[54] CABLE DRIVE ASSEMBLY

[72] Inventor: Robert J. Prest, Concord, Mass.

[73] Assignee: Technical Operations, Incorporated, Burlington, Mass.

[22] Filed: June 11, 1971

[21] Appl. No.: 153,476

[52] U.S. Cl. .................. 226/76, 226/183, 226/168, 254/175.5
[51] Int. Cl. ............................................. B66d 1/76
[58] Field of Search .......... 226/183, 168, 171, 76, 52; 254/150, 175.5

[56] References Cited

UNITED STATES PATENTS

| | | |
|---|---|---|
| 2,802,636 | 8/1957 | Sandford .................. 254/150 |
| 3,055,638 | 9/1962 | Good ......................... 226/183 |
| 3,078,074 | 2/1963 | Benedict ................ 226/183 X |
| 3,262,622 | 7/1966 | Conover ................ 226/183 X |

Primary Examiner—Allen N. Knowles
Attorney—Rosen & Steinhilper

[57] ABSTRACT

A cable drive assembly for driving a cable of the type having a helical wire winding includes a replaceable guide and wear strip which is captured by and between a pair of like half-housing members. A pair of bushings, also captured between the half-housing members, secure the ends of the wear strip. A novel drag brake assembly is also disclosed.

20 Claims, 5 Drawing Figures

PATENTED SEP 12 1972 3,690,529

CABLE DRIVE ASSEMBLY

BACKGROUND OF THE INVENTION

Cable drive devices of the general type with which this invention is concerned are well known. However, the prior art devices have been found to be subject to rapid wear. Prior art devices typically have aluminum housing structures in order to minimize weight; however, aluminum is a relatively soft material and is unable to endure the abrasive effects of the running cable for a satisfactory length of time. Housing structures composed of wear-resistant materials are inevitably intolerably heavy.

Further, all known prior art cable drive devices of the type discussed are relatively costly to manufacture due to the number and complexity of machining operations required.

OBJECTS OF THE INVENTION

It is an object of this invention to provide an improved cable drive assembly which can be made substantially completely from relatively soft metals or alloys, or even from plastic materials, and yet which has a substantially greater wear resistance and longer life than any known prior art devices.

It is yet another object of this invention to provide an improved cable drive assembly which can be restored, if wear does eventually develop, in a matter of minutes at very low cost and with relatively little inconvenience.

It is still another object to provide an improved cable drive assembly having a novel drag brake which is efficient, convenient in use, and simple in its structure and operation.

It is a further object to provide an improved cable drive assembly producing a relatively low frictional drag on the driven cable.

It is an important object to provide a cable drive assembly which has all the features and advantages above described and more, and yet which is relatively inexpensive to manufacture and maintain by comparison with any prior art devices known.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein:

FIG. 5 shows the drag brake in an operative state.

DESCRIPTION OF THE PREFERRED EMBODIMENTS

Figures 1, 2:
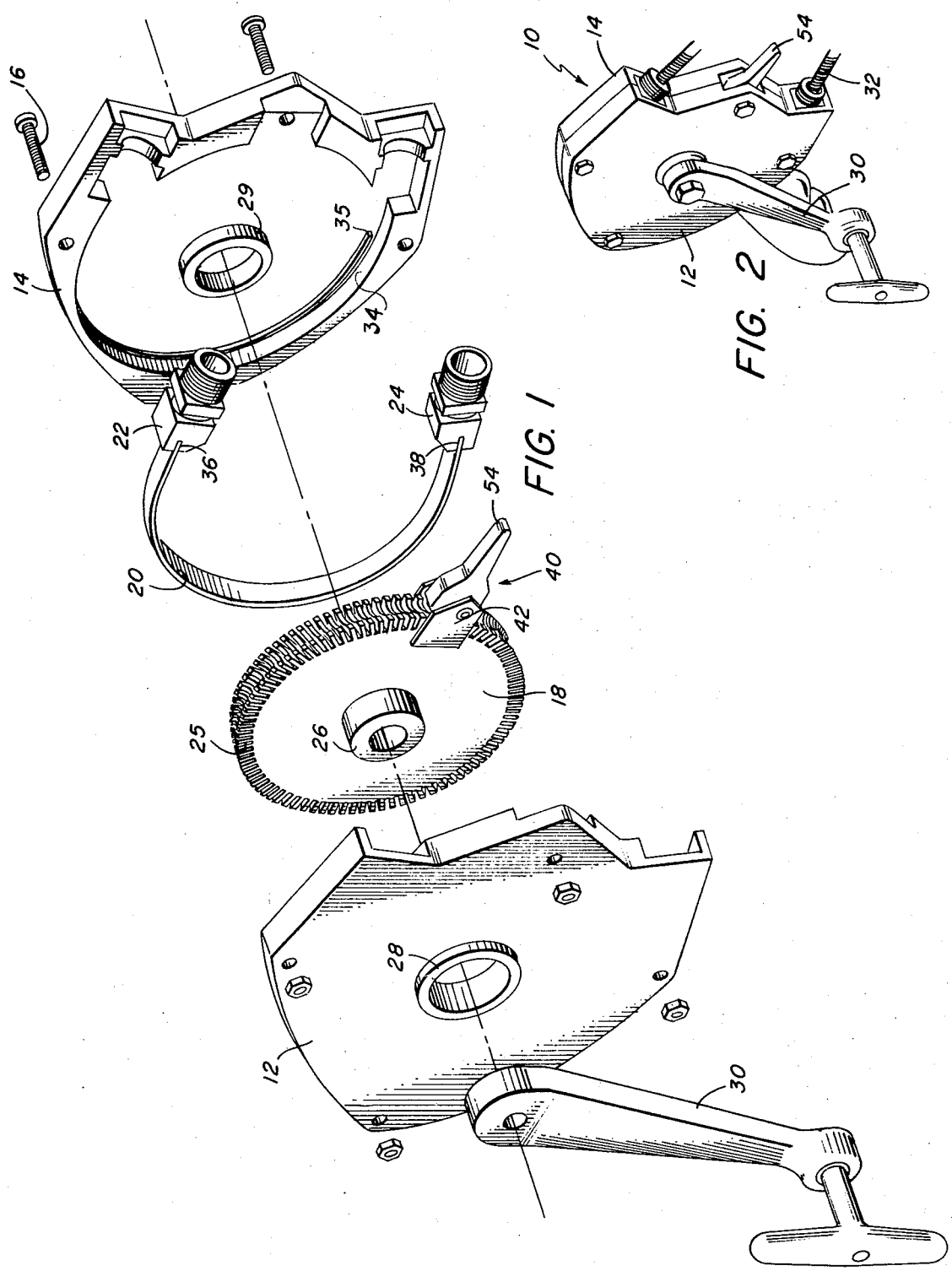
FIG. 1 is an exploded perspective view of a novel cable drive assembly according to this invention.
FIG. 2 is a perspective view of the FIG. 1 assembly as it would appear fully assembled and ready for operation.
Figure 3:
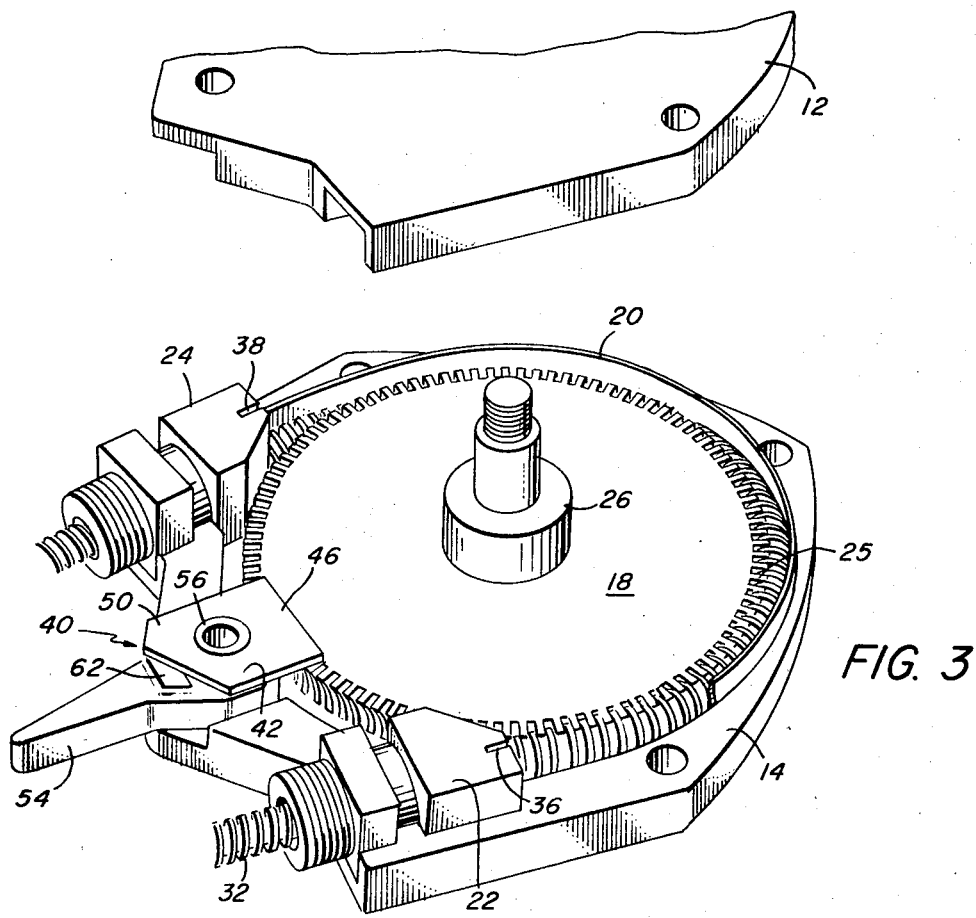
FIG. 3 is a perspective view of the FIGS. 1-2 cable drive assembly with a section of a housing for the assembly removed to reveal otherwise hidden components.

The drawings illustrate a cable drive assembly 10 representing one of the many possible implementations of the teachings of this invention. The assembly 10 according to this invention is of a general type used to drive a cable having an outside helical wire winding. The assembly 10 is illustrated as comprising a pair of identical half-housing members 12, 14 which are secured together, as by bolts 16, to define a housing for the assembly 10. The half-housing members 12, 14 may, according to this invention, be cast from a relatively soft metal or may be injection molded from a synthetic resin such as acetal.

The half-housing members 12, 14 capture a cable drive sprocket 18, a novel guide and wear strip 20, and a pair of bushings 22, 24. The sprocket 18 includes peripheral teeth 25 for engaging the helical wire winding on the cable to provide a positive drive coupling with the cable, as is well known in the prior art. A pair of hubs, one of which is shown at 26, act as journals for the sprocket 18, being received in bearing inserts 28, 29 held in the half-housing members 12, 14. The inserts 28, 29 may be composed of a low friction material such as Nylon.

The sprocket 18 is connected to a crank handle 30 by which sprocket 18 may be manually rotated to drive cable 32. Whereas the illustrated assembly is adapted for manual operation, the principles of this invention are equally applicable to the construction of power-driven cable drive assemblies.

In accordance with one aspect of this invention, there is provided a novel replaceable guide and wear strip 20. The strip 20 is captured by the half-housing members 12, 14 in grooves formed between ridges 35 and arcuate support surfaces 34 formed integrally in the half-housing members 12, 14.

The ends of the strip 20 are held in slots 36, 38 in the bushings 22, 24. The bushings 22, 24 are received in recesses in the half-housing members 12, 14 and are preferably composed of a relatively hard wear-resistant material such as steel. The bushings 22, 24 define inlet and outlet openings for entrance and exit of the cable 32 from the assembly housing defined by members 12, 14. The bushings 22, 24 serve to guide the cable 32 into tangency with the sprocket 18 in order to insure a smooth and reliable operation of the assembly and also function to align the half-housing members 12, 14 during assembly of the device.

The wear strip 20 is preferably a flexible, naturally straight strip composed of a wear-resistant, low-friction material. In a preferred embodiment the strip 20 is composed of hardened steel which has excellent wear characteristics and a moderately low coefficient of friction. For applications in which easy running of the cable is more important than long wear, the strip 20 may be composed of Nylon, Teflon, or other suitable materials having a low coefficient of friction. A great many other materials suitable for the strip 20 are contemplated, the particular material selected for a given application being dependent upon the requirements of the application.

Because the wear strip 20 provided according to this invention receives substantially all of the abrasion by the cable the half-housing members 12, 14, as suggested above, may be composed of a relatively soft and wear-susceptible material. The cable half-housing members 12, 14 may be formed of injection-molded plastic, relatively soft metals such as aluminum or zinc alloys, and many other materials which have otherwise suitable properties and cost factors but not necessarily long wear characteristics.

In the event that wear is eventually produced on the wear strip 20, the assembly may be restored by merely opening the housing and inverting the wear strip to bring the back surface of the strip 20 into operative engagement with the cable 32. When the strip 20 has been worn completely, or if damaged, it may be removed and replaced in a matter of minutes at relatively low cost. The wear strip 20 is held in the housing solely by the resotrative forces in the strip acting against the ridges 35 and support surfaces 34 and may be removed with no difficulty whatsoever.

Tests have been run on the device constructed as shown in FIGS. 1–5 employing a 0.025 in. thick hardened steel wear strip, during which tests 475 miles of cable was driven through the device without depleting the wear-resisting properties of the wear strip 20. At the end of the test, a 0.010 in. groove had been worn in the strip. Inversion of the strip had not yet been required.

In accordance with another aspect of this invention there is provided in the assembly 10 a drag brake 40 for imposing a frictional drag on movement of the cable 32 through the assembly. The illustrated drag brake 40 comprises a like pair of friction plates 42, 44 which have first end portions 46, 48 supported to engage opposite side faces of the sprocket 18, and second end portions 50, 52 supported to extend radially beyond the sprocket 18. A brake lever 54 disposed between the plates 42, 44 is adapted to rotate between an inoperative position (shown in FIG. 4) and an operative position (shown in FIG. 5). The brake lever 54 has a hub 56 which passes through openings in the plates 42, 44 and into recesses in the half-housing members 12, 14, permitting the lever 54 to be rotated about the axis of the hub 56 while loosely retaining the friction plates 42, 44 between the lever 54 and the half-housing members 12, 14.

The half-housing members 12, 14 define an entrance into the housing for receiving the lever 54, which entrance includes a mouth having beveled side surfaces 58, 60.

The lever 54 has formed integrally thereon a pair of oppositely facing cams 62, 64 which extend from the side surfaces of the brake lever 54 and which have ramp-like edges to enable the cams 62, 64 to pass under and lift the second end portions 50, 52 of the plates 42, 44.

Figure 4:
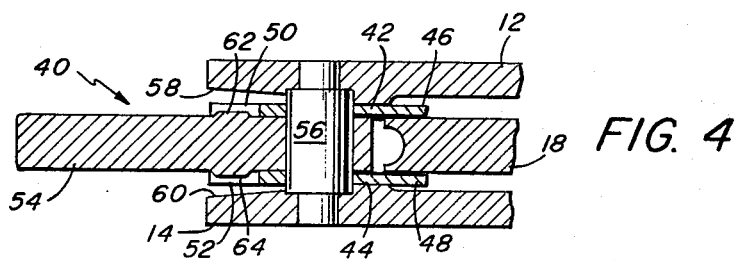
FIGS. 4 and 5 are sectional views of a novel drag brake comprising part of the FIGS. 1-3 assembly; the drag brake is shown in an inoperative state in FIG. 4.
Figure 5:
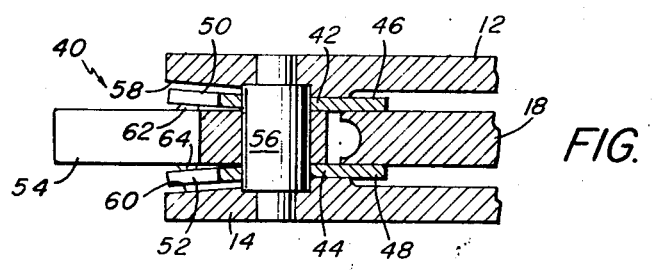

The operation of the novel drag brake 40 according to this invention will now be described. When the brake lever 54 is in an inoperative position, as shown in FIG. 4, the cams 62, 64 are angularly displaced from the second end portions 50, 52 of the plates 42, 44 and do not make engagement therewith. When the brake lever 54 is rotated (clockwise in FIG. 3) to its operative position, the cams 62, 64 act to wedge apart the second end portions 50, 52 of the plates 42, 44, causing the plates 42, 44 to rock about a fulcrum defined by the half-housing members 12, 14 at the bottom ends of the beveled surfaces 58, 60, thus bringing the first end portions 46, 48 of the plates 42, 44 into frictional engagement with the side faces of the sprocket 18.

In the illustrated embodiment, which employs a pair of friction plates, the effect produced is a frictional pinching of the sprocket 18 which retards rotation of the sprocket 18 and thus movement of the cable through the assembly. Other embodiments are contemplated wherein a single friction plate is employed and wherein other means for camming and pivoting a friction plate or plates are employed.

The invention is not limited to the particular details of construction of the embodiments depicted, and it is contemplated that various and other modifications and applications will occur to those skilled in the art.

Therefore, because certain changes may be made in the above-described product without departing from the true spirit and scope of the invention herein involved, it is intended that the subject matter of the above depiction shall be interpreted as illustrative and not in a limiting sense.

What is claimed is:

1. A cable drive assembly especially for driving a cable of the type having an outside helical winding for facilitating drive of the cable, comprising:
   housing means having a cable inlet opening and a cable outlet opening;
   sprocket means mounted to rotate in said housing means for engaging said winding to drive the cable;
   means coupled to said sprocket means for rotating said sprocket means to drive the cable; and
   a wear and guide element retained in said housing means in a configuration and position effective to guide the cable in at least a part of its travel between said inlet and outlet openings in said housing means and to receive a substantial part of the abrasive effects of the cable.

2. The apparatus defined by claim 1 wherein said element is a discrete replacement component of said assembly.

3. The apparatus defined by claim 2 wherein said housing means comprises a like pair of half-housing members which cooperate to capture said element within said housing.

4. The apparatus defined by claim 2 wherein said element is a strip composed of a synthetic material having a low coefficient of friction.

5. The apparatus defined by claim 2 wherein said element is a strip of hardened steel.

6. A cable drive assembly especially for driving a cable of the type having an outside helical winding for facilitating drive of the cable, comprising:
   housing means having a cable inlet opening and a cable outlet opening;
   sprocket means mounted to rotate in said housing means for engaging said winding to drive the cable;
   means coupled to said sprocket means for rotating said sprocket means to drive the cable; and
   a replaceable wear and guide strip retained in said housing means in a configuration and position effective to guide the cable in at least a part of its travel between said inlet and outlet openings in said housing means and to receive a substantial part of the abrasive action produced by cable running through the assembly, said strip being composed of a material substantially harder and more wear-resistant than the material of which said housing means is composed.

7. The apparatus defined by claim 4 wherein said strip is a relatively flexible and naturally straight strip of hardened steel.

8. The apparatus defined by claim 7 wherein said housing means comprises a like pair of half-housing members which cooperate to capture said strip within said housing.

9. The apparatus defined by claim 8 wherein said half-housing members are composed of an aluminum-zinc alloy.

10. The apparatus defined by claim 8 wherein said half-housing members are composed of a synthetic resin.

11. A cable drive assembly for driving a cable of the type having an outside helical wire winding for facilitating drive of the cable, comprising:
  a like pair of half-housing members which mate to define housing means;
  a pair of bushings captured between said members and defining a cable inlet opening and a cable outlet opening;
  sprocket means mounted to rotate in said housing means and having teeth for engaging said winding to drive the cable;
  means coupled to said sprocket means for rotating said sprocket means to drive the cable; and
  a discrete, replaceable wear and guide strip captured and retained in said housing means by and between said half-housing members and said bushings, said bushings and said strip cooperating to guide the cable between said inlet and outlet openings in said housing means and over said sprocket means and to receive a substantial part of the abrasive action produced by cable running through the assembly, said strip being composed of a material substantially harder and more wear resistant than the material of which said housing members are composed.

12. The apparatus defined by claim 11 wherein said strip is composed of hardened steel.

13. The apparatus defined by claim 12 wherein said half-housing members are composed of an aluminum-zinc alloy.

14. The apparatus defined by claim 11 wherein said half-housing members are composed of a thermoplastic resin.

15. The apparatus defined by claim 14 wherein said strip is composed of hardened steel.

16. In a cable drive assembly including housing means and cable drive means mounted to rotate in the housing means for engaging and driving a cable, a drag brake comprising:
  friction plate means;
  support means for supporting a first end portion of said friction plate means contiguous with said cable drive means and a second end portion thereof radially beyond said drive means, said support means including fulcrum means located between said first and second end portions of said friction plate means; and
  a brake operator mounted to move between inoperative and operative positions, said brake operator including cam means effective when said operator is moved to said operative position to engage said second end portion of said friction plate means so as to rock said friction plate means about said fulcrum means to bring said first end portion thereof into frictional engagement with said cable drive means to thereby retard rotation thereof and thus movement of the cable through said assembly.

17. In a cable drive assembly including housing means and sprocket means mounted to rotate in the housing means for engaging and driving a cable of the type having an outside helical winding, a drag brake comprising:
  a like pair of friction plates;
  support means for supporting said plates loosely in parallel, one on each side of said sprocket means with first end portions of said plates contiguous with peripheral portions of opposite side faces of said sprocket means and second end portions thereof radially beyond said sprocket means, said support means including a pair of fulcrum means, one located between said first and second end portions of each of said friction plates; and
  a brake lever disposed between said plates and serving as part of said support means therefor, said lever being mounted to move between inoperative and operative positions and including cam means effective when said lever is moved to said operative position to engage said second end portions of each of said friction plates so as to rock said plates about the respectively associated fulcrum means to bring said first end portions thereof into frictional engagement with said opposite side faces of said sprocket means to thereby retard rotation thereof and thus movement of the cable through said assembly.

18. The apparatus defined by claim 17 wherein said housing means defines a passageway therein for receiving said lever and has said pair of fulcrum means formed integrally therewith so as to extend into said passageway from opposite sides thereof.

19. The apparatus defined by claim 18 wherein said lever is supported by said housing means to pivot in said passageway between said inoperative and operative positions, said lever having cams formed integrally on opposite sides thereof for engaging said second portions of said friction plates, whereby pivoting of said lever to said operative position causes said cams to engage and separate said second end portions of said plates to thereby bring said first portions thereof into constrictive frictional engagement with said sprocket means.

20. A cable drive assembly for driving a cable of the type having an outside helical winding for facilitating drive of the cable, comprising:
  housing means having a cable inlet opening and a cable outlet opening;
  sprocket means mounted to rotate in said housing means for engaging said winding to drive the cable;
  manual operator means coupled to said sprocket means for providing for user rotation of said sprocket means to drive the cable;
  a discrete, replaceable wear and guide strip retained in said housing means in a configuration and position effective to guide the cable in at least a part of its travel between said inlet and outlet openings in said housing means and to receive a substantial part of the abrasive action produced by cable running through the assembly, said strip being composed of a material substantially harder and more wear resistant than the material of which said housing means is composed; and a drag brake, comprising:

friction plate means;

support means including said housing means for supporting a first end portion of said friction plate means contiguous with a side face of said sprocket means and a second end portion thereof radially beyond said sprocket means, said support means including fulcrum means located between said first and second end portions of said friction plate means;

a brake operator mounted to move between inoperative and operative positions, said brake operator including cam means effective when said operator is moved to said operative position to engage said second end portion of said friction plate means so as to rock said friction plate means about said fulcrum means to bring said first end portion thereof into frictional engagement with said side face of said sprocket means to thereby retard rotation thereof and thus movement of the cable through said drive assembly.

* * * * *